US008102084B2

(12) United States Patent
Kenington

(10) Patent No.: US 8,102,084 B2
(45) Date of Patent: Jan. 24, 2012

(54) BUS BAR POWER DISTRIBUTION FOR AN ANTENNA EMBEDDED RADIO SYSTEM

(75) Inventor: Peter Kenington, Chepstow (GB)

(73) Assignee: Ubidyne, Inc., Wilmington, DE (US)

( * ) Notice: Subject to any disclaimer, the term of this patent is extended or adjusted under 35 U.S.C. 154(b) by 183 days.

(21) Appl. No.: 12/562,313

(22) Filed: Sep. 18, 2009

(65) Prior Publication Data

US 2011/0068623 A1 Mar. 24, 2011

(51) Int. Cl.
*H01B 7/30* (2006.01)
(52) U.S. Cl. ........................................ 307/147
(58) Field of Classification Search ........... 307/147
See application file for complete search history.

(56) References Cited

U.S. PATENT DOCUMENTS

| 4,631,622 | A | 12/1986 | Howell |
| 4,914,446 | A | 4/1990 | Lindenmeier et al. |
| 6,028,564 | A | 2/2000 | Duan et al. |
| 6,278,400 | B1 | 8/2001 | Cassen et al. |
| 7,252,524 | B1 * | 8/2007 | Johnson et al. ............ 439/210 |

FOREIGN PATENT DOCUMENTS

| DE | 1959766 | 6/1971 |
| EP | 0323169 | 7/1989 |
| EP | 0323170 | 7/1989 |
| EP | 0269723 | 3/1993 |
| EP | 1110276 | 6/2001 |
| FR | 2696885 | 4/1994 |
| WO | 00/21159 | 4/2000 |
| WO | 2007/036708 | 4/2007 |

OTHER PUBLICATIONS

"DC Power Technology", Rackable Systems, www.rackable.com, Jul. 29, 2008.
"Connecting a DC Power Source", http://publib.boulder.ibm.com/infocenter/systems/scope/hw/topic/iphbf/dc.htm, Jun. 29, 2009.
"Blue Sea 2104 Powerbar Bus Bar 4×⅜ Studs—600A DC", http://us.binnacle.com/product_info.php?products_id=5151, Jun. 29, 2009.

* cited by examiner

*Primary Examiner* — Robert L. Deberadinis
(74) *Attorney, Agent, or Firm* — Stephen H. Eland; Dann, Dorfman, Herrell & Skillman

(57) ABSTRACT

A power distribution for an array of active electronic circuits in an antenna of a mobile communications base-station is disclosed. The power distribution comprises a first conductor connectable to a first terminal of a power supply unit, and a second conductor connectable to a second terminal of the power supply unit. The first conductor and the second conductor are at least partly bare and rigid, and are routed to the antenna-embedded radios in a manner separate from each other.

19 Claims, 5 Drawing Sheets

BUS BAR POWER DISTRIBUTION FOR AN ANTENNA EMBEDDED RADIO SYSTEM

FIELD OF THE INVENTION

The field of the present invention relates to a power distribution, for example for use in an array of active electronic circuits within or adjacent to an antenna in a mobile communications base-station.

BACKGROUND OF THE INVENTION

Currently power distribution within an array of active electronic circuits located within or adjacent to an antenna is achieved using a "star" topology, i.e. a pair of wires (positive and ground) is connected from the power supply to each one of the active electronic circuits individually. For 16 antenna elements this results in 16 pairs of (relatively) high-current wires being required. These wires are also often flexible and therefore require insulating throughout their length which adds to the weight and cost of the wires.

The European patent application 0 323 169 describes a power distribution system for a phased array radar. The power distribution system includes a large number of small capacitors, at least one per module, a lesser number of large capacitors, at least one at each end of each row, and bus bars dimensioned for a very small radio frequency (RF) impedance for supplying peak power in a timely manner to the modules from the large capacitors. The European patent application 0 323 169 A2 describes a hierarchy of the power distribution system and an interaction between the various components of the power distribution system. The bus bar described in EP 0 323 169 A2 is a multi-layer laminate, i.e. a printed circuit board (PCB). The multi-layer laminates of the required size are expensive and have a high weight.

SUMMARY OF THE INVENTION

It would be desirable to have a power distribution for use in an array of active electronic circuits in a mobile communications base-station that is relatively inexpensive and relatively light in weight. It would further be desirable that the power distribution has a good efficiency and does not generate excessive losses. These concerns and/or possible other concerns are addressed by a power distribution for an array of active electronic circuits located within or adjacent to an antenna in a mobile communications base-station that comprises a first conductor connectable to a first terminal of a power supply unit and a second conductor connectable to a second terminal of the power supply unit. The first conductor and the second conductor are at least partly bare and rigid and are routed to the active electronic circuits in a manner separate from each other.

In the power distribution no insulation is needed for at least portions of at least one of the first conductor and the second conductor. A risk of short circuits is avoided or at least reduced by separate routing the first conductor and the second conductor in a manner separate from each other, and by the fact that at least portions of the first conductor and/or the second conductor are rigid. The term "separate routing" means that the first conductor and the second conductor each have a defined path between the power supply unit and the array of active electronic circuits (or within the array of active electronic circuits for a sub-distribution of power to the individual active electronic circuits) that neither the first conductor nor the second conductor spatially coincide with each other, even partly. Separate routing may be achieved by measures that prevent a direct contact between a bare portion of the first conductor and a bare portion of the second conductor.

The first conductor may be routed along a first side of the active electronic circuits and the second conductor may be routed along a second side of the active electronic circuits. The routing of the first and second conductors along different sides of the active electronic circuits may allow more evenly distributed exploitation of the available space.

The array may comprise a plurality of interstices between the active electronic circuits and the first conductor may be routed along a first one of the plurality of interstices and the second conductor may be routed along a second one of the plurality of interstices. This relation between the first conductor and a first one of the plurality of interstices, as well as a relation between the second conductor and a second one of the plurality of interstices, allows for a balanced distribution of the first conductor and the second conductor. At the same time, the first conductor and the second conductor may be routed in proximity to each of the active electronic circuits so that between the first conductor and the second conductor and the active electronic circuits only a short distance, if any, needs to be bridged in order to assure power distribution to the active electronic circuits. The term "interstices" also is intended to encompass the edges of the array.

The first conductor may be routed along alternate ones of the plurality of interstices and the second conductor may be routed along alternate ones of the plurality of interstices separate from the alternate ones of the plurality of interstices along which the first conductor is routed. In this manner the first conductor is, for example, on the left side of a specific set of active electronic circuits, while the second conductor is located on the right side of this specific set of active electronic circuits.

At least a portion of the first conductor may be routed along at least a portion of an edge of the array and at least a portion of the second conductor may be routed in between the active electronic circuits of the array (or vice versa).

At least one of the first conductor and the second conductor may comprise a trunk portion and a plurality of branch portions that connect the trunk portion with the active electronic circuits. The trunk portion extends from the power supply unit to a point that is reasonably close to one or more of the active electronic circuits. The remaining distance between this point and the active electronic circuits may then be covered by one branch portion out of the plurality of branch portions.

The power distribution may further comprise fixation elements for fixing at least one of the first conductor and the second conductor to a chassis of the array of active electronic circuits.

The fixation elements may be insulating spacers between the chassis and the first conductor. In the alternative or in addition the insulating spacers may be between the chassis and the second conductor. Individual ones of the insulating spacers may be present between the chassis and the first conductor, as well as between the chassis and the second conductor.

The chassis may comprise an insulating material. The first conductor and the second conductor may be placed directly on the surface of the insulating material of the chassis and the fixation elements may be screws, hooks, clamps, snap taps or another suitable element.

At least a part of the second conductor may be formed by a chassis of the array of active electronic circuits. The chassis or a part of the chassis may assume the role of the second conductor (or the first conductor) if the chassis or at least a part of the chassis if made from an electricity conducting material. The use of the chassis as one of the conductors can save weight and cost, since it effectively removes the need for one of the conductors throughout the system (together with the insulation of the removed conductor, in the case of a flexible conductor).

At least one of the first conductor and the second conductor may be part of a mounting structure of each of the active electronic circuits. Using the first conductor and/or the second conductor as part of the mounting structure may save further weight, as some of the existing mechanical structures could be reduced in thickness, since the demands placed on the rigidity of the mechanical structures would be reduced.

At least one of the first conductor and the second conductor may be tapered. Tapering the first conductor and/or the second conductor may provide a further weight and material cost saving. Tapering of one or both of the conductors takes advantage of the reduced current conduction requirements placed upon the conductors as the number of transceivers which the conductors need to supply reduces with distance from the power supply unit. This approach therefore saves weight and cost without significantly increasing the losses in the conductors, with its consequent impact upon system efficiency.

The power distribution may further comprise flexible power connections between individual ones of the active electronic circuits and at least one of the first conductor and the second conductor. Typically, the flexible power connection only needs to bridge a short distance between the first conductor and/or the second conductor and one of the active electronic circuits. The flexible power connections may be easy to install during the manufacture of the array of active electronic circuits. Furthermore, the first conductor and the second conductor may be routed in such a manner that the distance between the first conductor and/or the second conductor and each of the arrays of active electronic circuits is substantially equal. In this case, the flexible power connections may have the same length which reduces the number of different parts required to be designed and manufactured for the array of active electronic circuits.

The power distribution may further comprise connectors adapted to detachably connect the flexible power connections with at least one of the first conductor and the second conductor. The connectors allow a temporary removal of the flexible power connections from the first/second conductor, for example during maintenance or repair of the array.

The power distribution may further comprise at least one additional conductor for providing at least one further electrical potential to the active electronic circuits, wherein the at least one additional conductor is connectable to at least one additional terminal of the power supply unit. The additional conductor allows the distribution of an additional electrical potential and thus of at least one additional electrical voltage.

The power distribution may be adapted for providing a direct current (DC) to the array of active electronic circuits. A centralised generation and conditioning of DC electrical power is usually more efficient, in both power usage and cost, than a localised generation within the active electronic circuits.

The power supply unit may be a direct current power supply unit and may be a part of the power distribution.

The power distribution may comprise a back-up power supply unit for providing the current to the array of active electronic circuits in case of a failure of the power supply unit. The back-up power supply unit adds redundancy to the power distribution so that the power distribution may usually continue to operate when the main power supply unit has failed. The failure of the main power supply unit may be reported to a failure management system of the base-station so that it may be serviced or replaced soon.

DETAILED DESCRIPTION OF THE INVENTION

The invention will now be described on the basis of the drawings. It will be understood that the embodiments and aspects of the invention described herein are only examples and do not limit the protective scope of the claims in any way. The invention is defined by the claims and their equivalents. It will also be understood that a feature of one aspect can be combined with the features of another aspect or other aspects.

Figure 1:
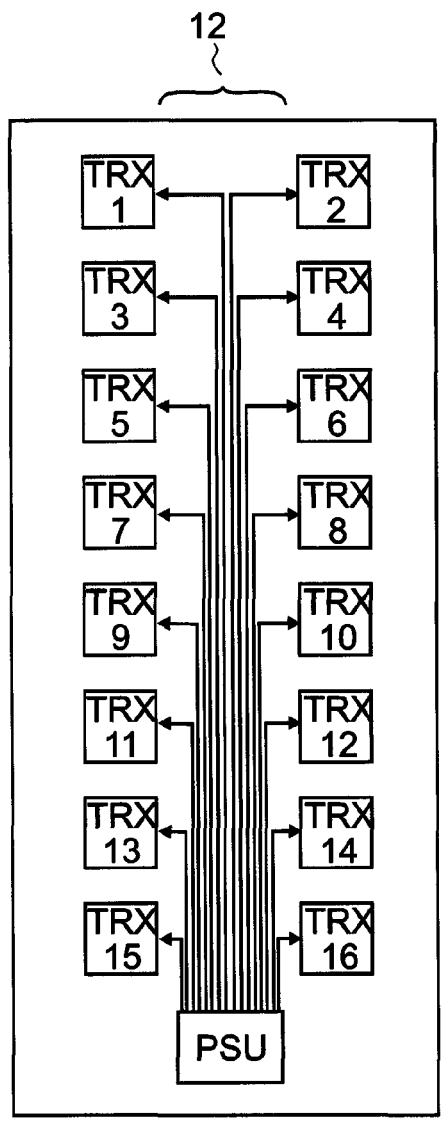
FIG. 1 shows a prior art power distribution.

FIG. 1 shows an existing method of distributing power within an adaptive antenna or antenna-embedded radio system. FIG. 1 shows in a schematic manner a 2-by-8 array of 16 antenna embedded radios TRX1-TRX16. Each one of the active electronic circuits or transceivers TRX1-TRX16 is directly connected to a power supply unit PSU, typically via a pair of multi-strand, flexible cables 12—one of the multi-strand, flexible cables 12 is for the positive connection and an other one of the multi-strand, flexible cables 12 is for the negative or ground connection. Each one of the multi-strand, flexible cables 12 is individually insulated, occupies a significant amount of space and has a certain weight. Furthermore, a compromise needs to be struck between the weight and cost of the multi-strand, flexible cables 12 versus their loss.

Figure 2:
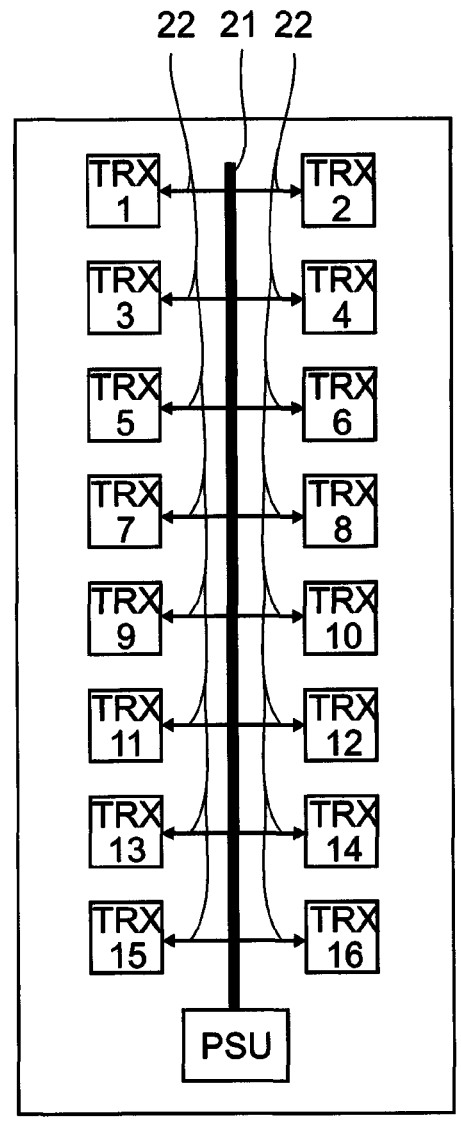
FIG. 2 shows a first example of a power distribution.

FIG. 2 shows one example for a bus-bar concept of power distribution. In this case, a single pair of bus-bars 21 is located centrally within the antenna, with short supply connections 22 taken from these bus-bars to the individual transceiver/antenna elements. Note that it is likely that in a practical implementation, the bus-bars 21 themselves would be rigid, for example being made from solid copper bars. The individual power connections 22 to the transceivers would be fabricated from the multi-strand, flexible wires, as will be explained in connection with FIG. 6. In the alternative, the connections 22 to the individual transceivers could be rigid (or semi-rigid), with little or no insulation being required.

Figure 3:
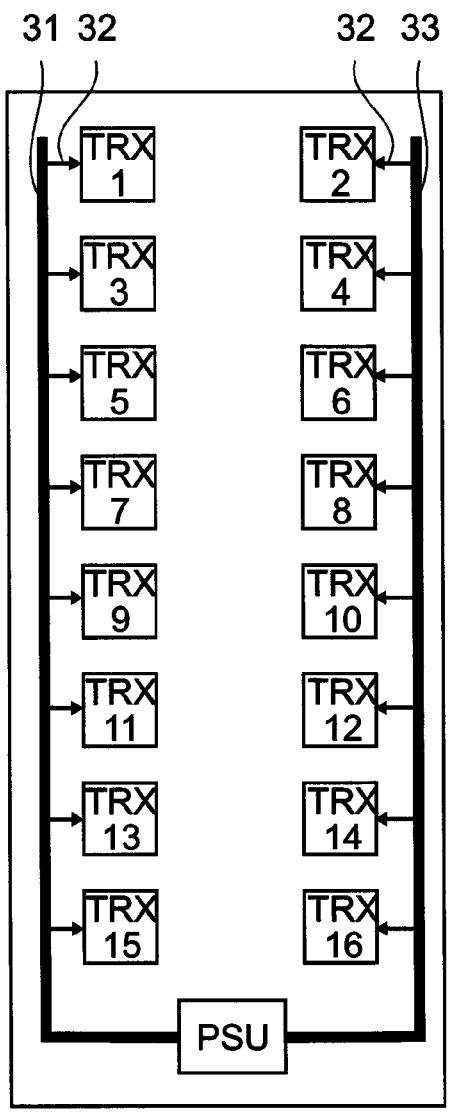
FIG. 3 shows a second example of a power distribution.

FIG. 3 shows a second example for the bus-bar concept of power distribution. In this case, the bus-bars 31 and 33 are split and located around the outside of the antenna structure. This approach would allow the (rigid) bus-bars 31 and 33 to be a part of the mechanical structure of the antenna itself, for example by providing the mechanical mounting facilities for the antenna elements or transceiver modules TRX1-TRX16. This would, in turn, save further weight, as some of the existing mechanical structures could be reduced in thickness, since the demands placed upon the rigidity of the mechanical structures would be reduced. The place between the two rows of transceivers TRX1-TRX16 may be used for other types of connections, such as data busses to and from a central hub (not shown) serving the array of transceivers. Supply connections 32 connect the bus bars 31 and 33 with the transceivers TRX1-TRX16. For clarity reasons, only the two upper supply connections for transceivers TRX1 and TRX2 are referenced with the reference sign 32.

Figure 4:
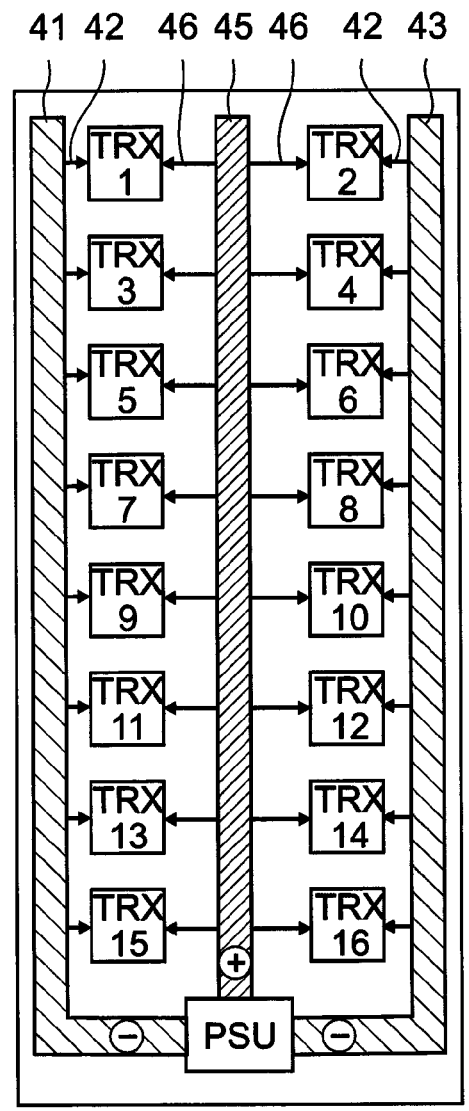
FIG. 4 shows a third example of the power distribution.

FIG. 4 shows a combination of the two examples shown in FIGS. 2 and 3. In the case of FIG. 4 the positive ("+") bus-bar 45 and the negative ("−") bus bars 41 and 43 are shown separately. The positive bus bar 45 is placed in the centre of the antenna structure of the array and the negative bus bars 41 and 43 are placed around the outside of the antenna structure or the array. Supply connections 42 connect the negative bus bars 41 and 43 with the transceivers TRX1-TRX16. Supply connections 46 connect the positive bus bar 45 with the transceivers TRX1-TRX16. This example extends the mechanical mounting options and also insures that the positive conductor 45 and negative conductors 41 and 43 are placed far apart, thereby minimizing the chances of accidental short circuits occurring between the positive conductor 45 and the negative conductors 41 and 43. Note that the position of the positive bus bar 45 and the negative bus bars 41 and 43 could be swapped in this example with no loss of functionality.

Note also that a variant to the example shown in FIG. 2 would be to place the positive bus bar 45 either on the far left-hand side or the far right-hand side of the transceiver/antenna elements (rather than in the centre). This would slightly lengthen some of the individual transceiver power connections 42 and 46, however it may be mechanically or logistically preferable in some circumstances. Likewise, it is possible to split the location of the positive bus bar 45 and the negative (or ground) bus bars 41 and 43, with one of the bus bars being located on the far left of the antenna-elements and the other of the bus bars on the far right.

Figure 5:
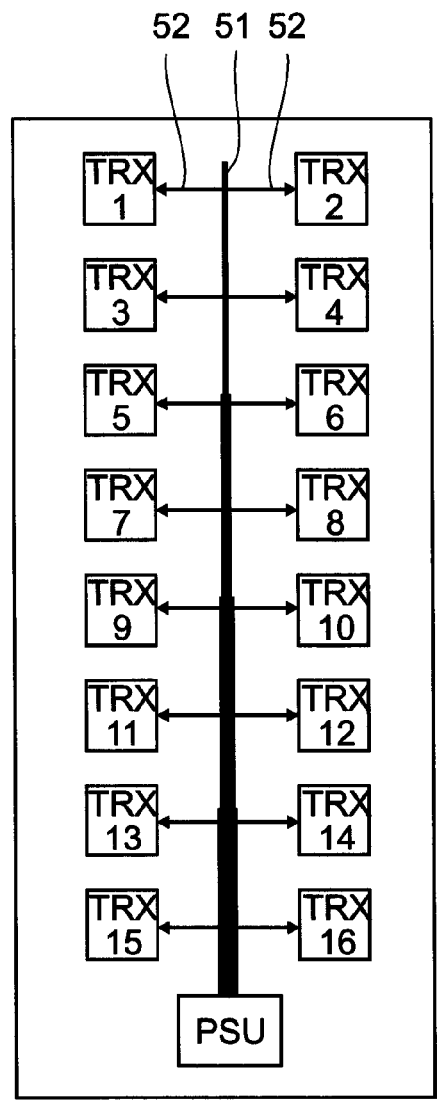
FIG. 5 shows a fourth example of the power distribution.

FIG. 5 shows a further variant of the example shown in FIG. 2, in which the thickness of the bus bar 51 is reduced or stepwise tapered, as the number of transceivers the bus bar is required to feed, reduces with the distance from the power supply unit PSU. The transceivers TRX1-TRX16 are connected to the bus bar 51 by means the of supply connections 52. This reduction or tapering of the bus bar provides a further weight and material cost saving. Additional fabrication costs may arise for the reduced or tapered bus bar 51 as shown in FIG. 5. Note that only four thicknesses are shown in FIG. 5, for clarity, however a greater number (e.g. 8) or a lesser number (e.g 2) could be chosen, depending upon the economic trade-off outlined above. These numbers are based upon the 16-element array shown in the examples in this disclosure. The numbers could change for different sizes of the arrays. It is also possible to apply this bus-bar thickness "reduction" or "tapering" concept to the other examples discussed above.

Figure 6:
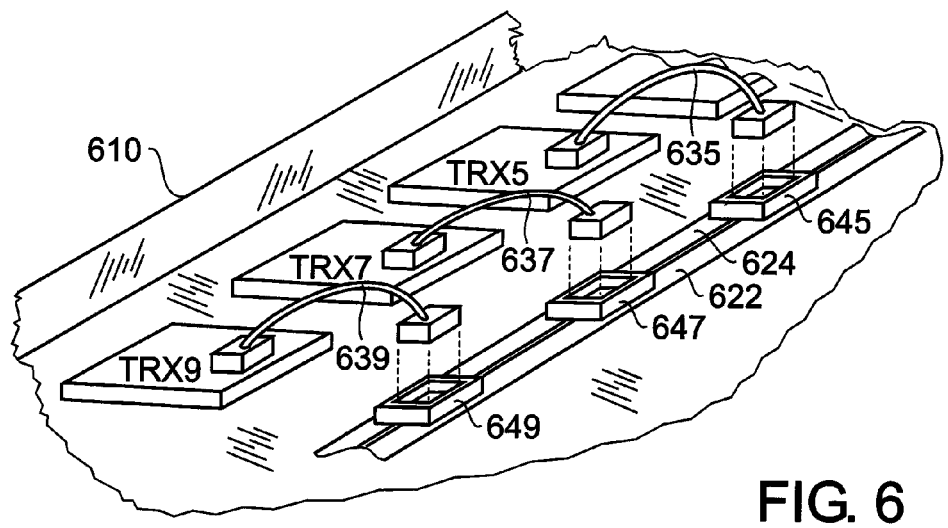
FIG. 6 shows a portion of an array of active electronic circuits in a perspective view to illustrate a possible configuration of the power distribution.

FIG. 6 shows a portion of the transceiver array in a perspective view. The array is mounted on a chassis 610. The positive bus bar 622 and the negative bus bar 624 extend in a parallel, yet separate manner along a row of transceivers comprising the transceivers TRX5, TRX7 and TRX9. Flexible connection 635, 637 and 639 connect the positive bus bar 622 and the negative bus bar 624 with each of the transceivers TRX5, TRX7 and TRX9, respectively. At an end that for connection with the positive bus bar 622 and the negative bus bar 624 the flexible power connections 635, 637 each comprise a plug that is adapted to fit into a matching connector or socket 645, 647 and 649 attached to the bus bars 622, 624.

Figure 10:
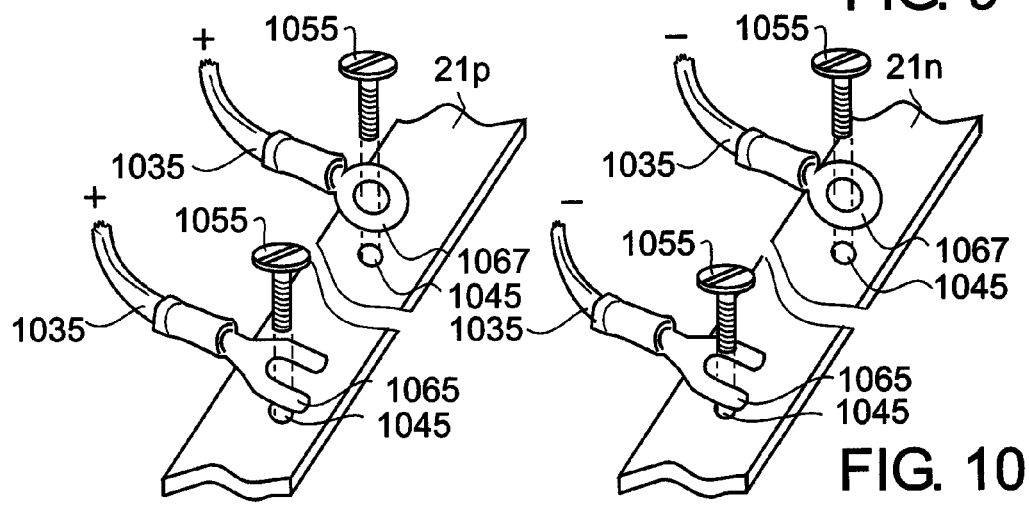
FIG. 10 shows examples for the connection between the bus bars and the flexible connections.

FIG. 10 shows another option for connecting the flexible connections 1035 with the positive bus bar 21p and the negative bus bar 21n. The bus bars 21p, 21n contain holes 1045 which have been tapped to accept a screw thread and the flexible connections 1035 could be terminated in crimped or soldered ring connectors 1067 (upper example in FIG. 10) or split-spade/fork connectors 1065 (lower example in FIG. 10). These ring connectors 1067 or split-spade/fork connectors 1037 could then be attached to the bus bars 21p, 21n by means of bolts 1055 passing through the ring or split-spade part of the terminations and screwed into the threaded holes 1045 in the bus-bars 21p, 21n.

Figure 7:
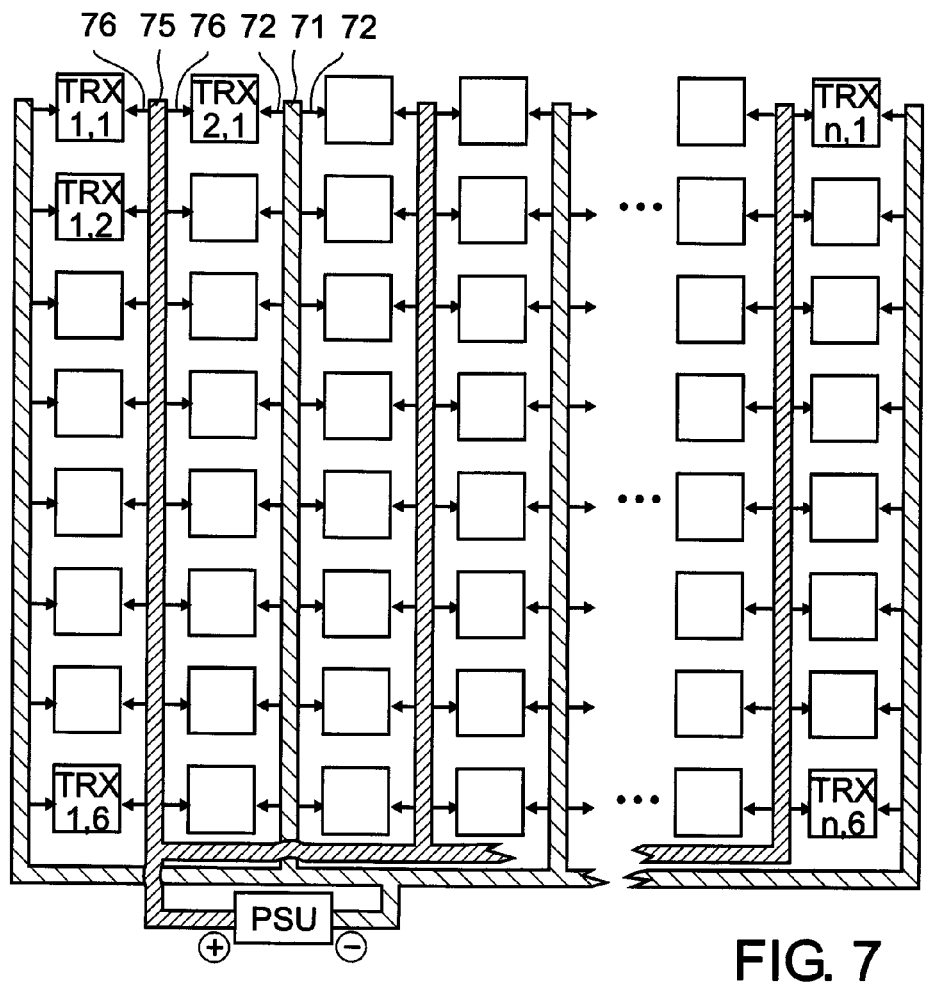
FIG. 7 shows a larger array of transceivers and a conceivable example of the power distribution.

FIG. 7 shows a larger array of transceivers TRX1,1-TRXn,6 and a conceivable example of the power distribution. Between two adjacent rows of the array one or more interstices belonging to a plurality of interstices can be found. The negative bus bar 71 extends along those interstices having an even number, e.g. 0, 2, 4 . . . . The positive bus bar 75 extends along those interstices having odd numbers, e.g. 1, 3, 5 . . . . Each row of the transceivers TRX1,1-TRXn,6 has the negative conductor 71 on the left side and the positive conductor 75 on the right side, or vice versa. The distance between the bus bars 71 and 75 and the transceivers TRX1,1-TRXn,6 is small so that individual branch portions for the transceivers may be short.

Figure 8:
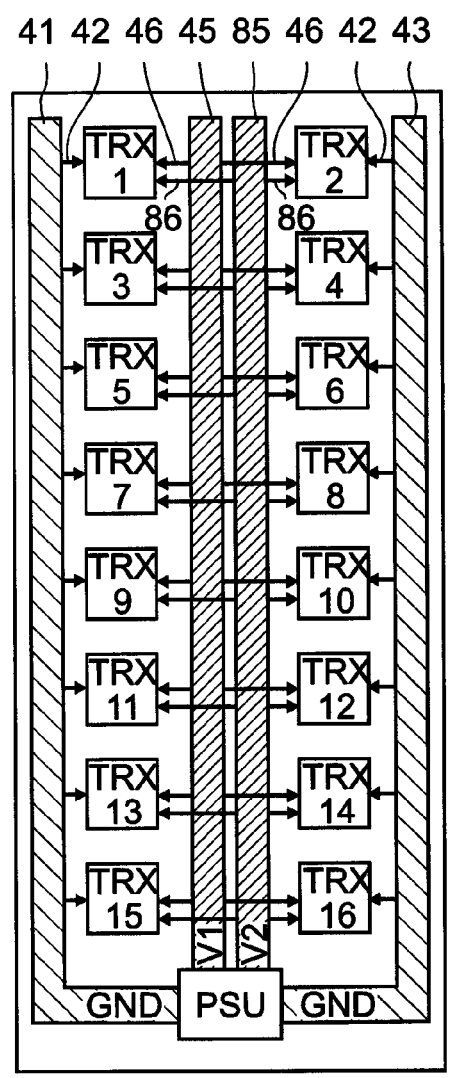
FIG. 8 shows a fifth example of the power distribution.

FIG. 8 shows a fifth example of the power distribution system. The power distribution according to the fifth example is derived from the third example of the power distribution depicted in FIG. 4. The power distribution according to the fifth example comprises two positive conductors 45 and 85. The first positive conductor 45 distributes a first electrical potential V1 from the power supply unit PSU to the transceivers TRX1-TRX16. The second positive conductor 85 distributes a second electrical potential V2 from the power supply unit PSU to the transceivers TRX1-TRX16. An electrical ground potential GND is distributed by means of the negative conductor. As in the third example of the power distribution shown in FIG. 4, the supply connections 46 connect the first positive bus bar 45 with the transceivers TRX1-TRX16. Likewise, supply connections 86 connect the second positive bus bar 85 with the TRX1-TRX16.

Figure 9:
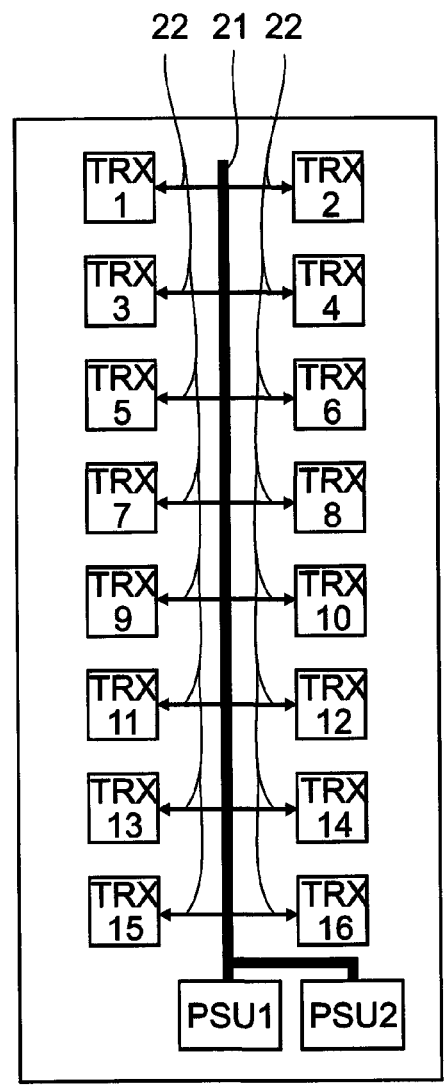
FIG. 9 shows a sixth example of the power distribution.

FIG. 9 shows a sixth example of the power distribution which is a variant of the first example of the power distribution in an array of active electronic circuits. Besides being connected to a main power supply unit PSU1 the power distribution is also connected to a back-up power supply unit PSU2. The back-up power supply unit PSU2 is activated when the main power supply unit PSU1 fails. The fact that the main power supply unit PSU1 has failed may be reported to a failure management system of the array of active electronic circuits or of the base transceiver station. Solitary power supply units as in the examples shown in FIGS. 2 to 8 represent a single point of failure and are therefore critical in terms of reliability. The back-up power supply unit PSU2 adds redundancy to the power distribution system, making the power distribution of the array of active electronic circuits more reliable.

While various embodiments of the present invention have been described above, it should be understood that they have been presented by way of example, and not limitation. It will be apparent to persons skilled in the relevant arts that various changes in form and detail can be made therein without departing from the scope of the invention. The present invention should not be limited by any of the above-described exemplary embodiments, but should be defined only in accordance with the following claims and their equivalents.

The invention claimed is:

1. An active antenna array of at least a first transceiver module and of at least a second transceiver module, which are located within or adjacent to an antenna in a mobile communications base-station comprising a power distribution mechanism wherein a first conductor connectable to a first terminal of a power supply unit is connected by at least a first power connection to the at least a first transceiver module: and said first conductor connectable to a first terminal of a power supply unit is further connected by at least, a second power connection to the at least a second transceiver module a second conductor connectable to a second terminal of the power supply unit is connected by at least a third power connection to the at least a second transceiver module and said second conductor connectable to a second terminal of the power supply unit is further connected to a fourth terminal of the at least a second transceiver module, and wherein the first conductor and the second conductor are at least partly bare and rigid, and are routed to the at least a first transceiver module and the at least second transceiver module in a manner separate from each other.

2. The active antenna array according to claim 1, wherein the first conductor is routed along a first side of the active electronic circuits and wherein the second conductor is routed along a second side of the active electronic circuits.

3. The active antenna array according to claim 1, wherein the array comprises a plurality of interstices between the at least a first transceiver module and the at least a second transceiver module and wherein the first conductor is routed along a first one of the plurality of interstices and wherein the second conductor is routed along a second one of the plurality of interstices.

4. The active antenna array according to claim 3, wherein the first conductor is routed along alternate ones of the plurality of interstices and the second conductor is routed along alternate ones of the plurality of interstices separate from the alternate ones of the plurality of interstices along which the first conductor is routed.

5. The active antenna array according to claim 1, wherein at least a portion of the first conductor is routed along at least a portion of an edge of the array, and wherein at least a portion of the second conductor is routed in between the at least a first transceiver module and the at least a second transceiver module of the array.

6. The active antenna array according to claim 1, wherein at least one of the first conductor and the second conductor comprises a trunk portion and a plurality of branch portions that connect the trunk portion with the at least a first transceiver module and the at least a second transceiver module.

7. The active antenna array according to claim 1, further comprising fixation elements for fixing at least one of the first conductor and the second conductor to a chassis of the array of at least a first transceiver module and the at least a second transceiver module.

8. The active antenna array according to claim 7, wherein the fixation elements are insulating spacers between the chassis and the first conductor.

9. The active antenna array according to claim 7, wherein the fixation elements are insulating spacers between the chassis and the second conductor.

10. The active antenna array according to claim 7, wherein the chassis comprises an insulating material.

11. The active antenna array according to claim 1, wherein at least a part of the second conductor is formed by a chassis of the array of at least a first transceiver module and the at least a second transceiver module.

12. The active antenna array according to claim 1, wherein at least one of the first conductor and the second conductor are part of a mounting structure of each of the active at least first a transceiver module and the at least a second transceiver module.

13. The active antenna array according to claim 1, wherein at least one of the first conductor and the second conductor is tapered.

14. The active antenna array according to claim 1, further comprising flexible power connections between individual ones of the at least a first transceiver module and the at least a second transceiver module and at least one of the first conductor and the second conductor.

15. The active antenna array according to claim 14, further comprising connectors adapted to detachably connect the flexible power connections with at least one of the first conductor and the second conductor.

16. The active antenna array according to claim 15, further comprising at least one additional conductor for providing at least one further electrical potential to the at least a first transceiver module and the at least a second transceiver module, wherein the at least one additional conductor is connectable to at least one additional terminal of the power supply unit.

17. The active antenna array according to claim 1, wherein the active antenna array is adapted for providing a direct current to the array of at least a first transceiver module and the at least a second transceiver module.

18. The active antenna array according to claim 17, wherein the power supply unit is a direct current power supply unit and is part of the power distribution.

19. The active antenna array according to claim 18, further comprising a back-up power supply unit for providing the direct current to the array of at least a first transceiver module and the at least a second transceiver module in case of a failure of the main power supply unit.

* * * * *